(12) United States Patent
Ogawa

(10) Patent No.: US 8,743,239 B2
(45) Date of Patent: Jun. 3, 2014

(54) IMAGE PROCESSING APPARATUS, CONTROL METHOD THEREOF, AND IMAGE-CAPTURING APPARATUS

(75) Inventor: Shigeo Ogawa, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 13/089,488

(22) Filed: Apr. 19, 2011

(65) Prior Publication Data

US 2011/0267494 A1    Nov. 3, 2011

(30) Foreign Application Priority Data

Apr. 28, 2010   (JP) ................... 2010-104235

(51) Int. Cl.
*H04N 9/73*   (2006.01)
*G06K 9/00*   (2006.01)

(52) U.S. Cl.
USPC ................... 348/224.1; 382/162; 382/167

(58) Field of Classification Search
USPC .......... 348/222.1, 223.1, 224.1; 382/162, 167
See application file for complete search history.

(56) References Cited

U.S. PATENT DOCUMENTS

| | | | |
|---|---|---|---|
| 4,733,296 A * | 3/1988 | Honbo et al. ................. | 348/263 |
| 5,198,890 A | 3/1993 | Suga | |
| 6,927,792 B1 * | 8/2005 | Mimura et al. ............ | 348/223.1 |
| 8,009,201 B2 * | 8/2011 | Takayama .................. | 348/222.1 |

FOREIGN PATENT DOCUMENTS

| | | |
|---|---|---|
| CN | 1346575 A | 4/2002 |
| CN | 1700733 A | 11/2005 |
| CN | 1856118 A | 11/2006 |
| CN | 1992819 A | 7/2007 |
| CN | 101207830 A | 6/2008 |
| CN | 101472188 A | 7/2009 |
| JP | 10-271519 | 10/1998 |
| JP | 2006165975 A | 6/2006 |
| JP | 2009164838 A | 7/2009 |
| JP | 2009-188461 | 8/2009 |
| WO | 2008018772 A | 2/2008 |

OTHER PUBLICATIONS

The above references were cited in a Jun. 9, 2013 Chinese Office Action, with an English Translation, that issued in Chinese Patent Application No. 201110109097.6.

\* cited by examiner

*Primary Examiner* — Sinh Tran
*Assistant Examiner* — Mark Monk
(74) *Attorney, Agent, or Firm* — Cowan, Liebowitz & Latman, P.C.

(57) ABSTRACT

Disclosed are an image processing apparatus which effectively corrects, by a simple method, color crosstalk that is generated in a captured image by light obliquely entering an image sensor, and a control method thereof. A white-detection area used in white balance processing for a captured image signal is set in accordance with an aperture value used in image capturing. The degree of color crosstalk depends on an aperture value used in image capturing, and the spectral sensitivity characteristic of the image sensor changes depending on the degree of color crosstalk. By setting a white-detection range to correct a change of the spectral sensitivity characteristic depending on the aperture value, color crosstalk can be simply, effectively corrected.

7 Claims, 7 Drawing Sheets

IMAGE PROCESSING APPARATUS, CONTROL METHOD THEREOF, AND IMAGE-CAPTURING APPARATUS

BACKGROUND OF THE INVENTION

1. Field of the Invention

The present invention relates to an image processing apparatus and control method thereof and, more particularly, to an image processing apparatus for suppressing color crosstalk in an image sensed by an image sensor, and a control method thereof.

The present invention also relates to an image-capturing apparatus using the image processing apparatus according to the present invention.

2. Description of the Related Art

An image sensor mounted in an image-capturing apparatus such as a digital camera has an arrangement in which pixels each having a photoelectric conversion element are arrayed in a matrix. The image sensor converts an object image formed via an optical system into an electrical signal for each pixel. A problem in the image sensor having this arrangement is "color crosstalk" generated when obliquely incident light enters not only a predetermined pixel but also an adjacent pixel.

The degree of color crosstalk changes depending on the pixel color (color of a color filter arranged in a pixel). Color crosstalk becomes large in a pixel of another color adjacent to a color filter of a high-transmittance color (generally green). For example, in an image sensor having color filters of a general Bayer array, color crosstalk caused by light which obliquely enters a green pixel out of red, green, and blue pixels, passes through the green color filter, and then enters an adjacent blue or red pixel becomes relatively large. The color crosstalk relatively increases the sensitivity of a blue or red pixel adjacent to a green pixel with respect to the green wavelength, and relatively decreases that of a green pixel.

As a technique for canceling color crosstalk, Japanese Patent Laid-Open No. 10-271519 discloses a technique of storing a correction coefficient determined based on the color crosstalk component, and correcting, using the correction coefficient, a color crosstalk component contained in an image signal output from an image sensor.

Japanese Patent Laid-Open No. 2009-188461 discloses a technique of changing the color crosstalk correction amount based on one of the aperture value, zoom position, and image capturing sensitivity setting in image capturing.

Conventionally, techniques related to preparing in advance a correction coefficient for correcting generated color crosstalk and correcting an image signal have been used as disclosed in Japanese Patent Laid-Open Nos. 10-271519 and 2009-188461. These methods correct an image signal by applying, to each color pixel, a gain for correcting a relative sensitivity difference caused by color crosstalk. When color crosstalk is large (sensitivity difference is large), a large gain must be applied. This may decrease the S/N ratio or degrade the image quality due to overcorrection and undercorrection. When different gains are applied for respective, red, green, and blue pixel colors, the luminance changes upon a change of a luminance composition ratio given by red:green:blue=3:6:1. Color crosstalk correction changes the exposure of an image to be captured.

Further, when the correction gain is applied to all the pixels of an image signal, the time taken for correction processing becomes longer as the number of pixels of the image sensor becomes larger.

SUMMARY OF THE INVENTION

The present invention has been made to overcome at least one of the conventional drawbacks, and to provide an image processing apparatus capable of effectively correcting color crosstalk by a simple method, a control method thereof, and an image-capturing apparatus.

According to one aspect of the present invention, there is provided an image processing apparatus which processes an image signal obtained using an image sensor including a color filter, the apparatus comprising: an obtaining unit configured to obtain an aperture value used in image capturing; a setting unit configured to set a white-detection area used in white balance processing for the image signal; and a correction unit configured to apply white balance processing to the image signal using the white-detection area set by the setting unit, wherein the setting unit sets a white-detection area based on the aperture value obtained by the obtaining unit to correct a change of a spectral sensitivity characteristic of the image sensor that is caused by color crosstalk of the image signal depending on an aperture value.

According to another aspect of the present invention, there is provided an image-capturing apparatus comprising: an image sensor including a color filter; and an image processing apparatus according to the present invention that processes an image signal obtained using the image sensor.

According to still another aspect of the present invention, there is provided a method of controlling an image processing apparatus which processes an image signal obtained using an image sensor including a color filter, the method comprising: an obtaining step of controlling the image processing apparatus to obtain an aperture value used in image capturing; a setting step of controlling the image processing apparatus to set a white-detection area used in white balance processing for the image signal; and a correction step of controlling the image processing apparatus to apply white balance processing to the image signal using the white-detection area set in the setting step, wherein in the setting step, a white-detection area based on the aperture value obtained in the obtaining step is set to correct a change of a spectral sensitivity characteristic of the image sensor that is caused by color crosstalk of the image signal depending on an aperture value.

With this arrangement, the present invention can effectively correct color crosstalk by a simple method.

Further features of the present invention will become apparent from the following description of exemplary embodiments with reference to the attached drawings.

DESCRIPTION OF THE EMBODIMENTS

An exemplary embodiment of the present invention will now be described in detail in accordance with the accompanying drawings.

Figure 1:
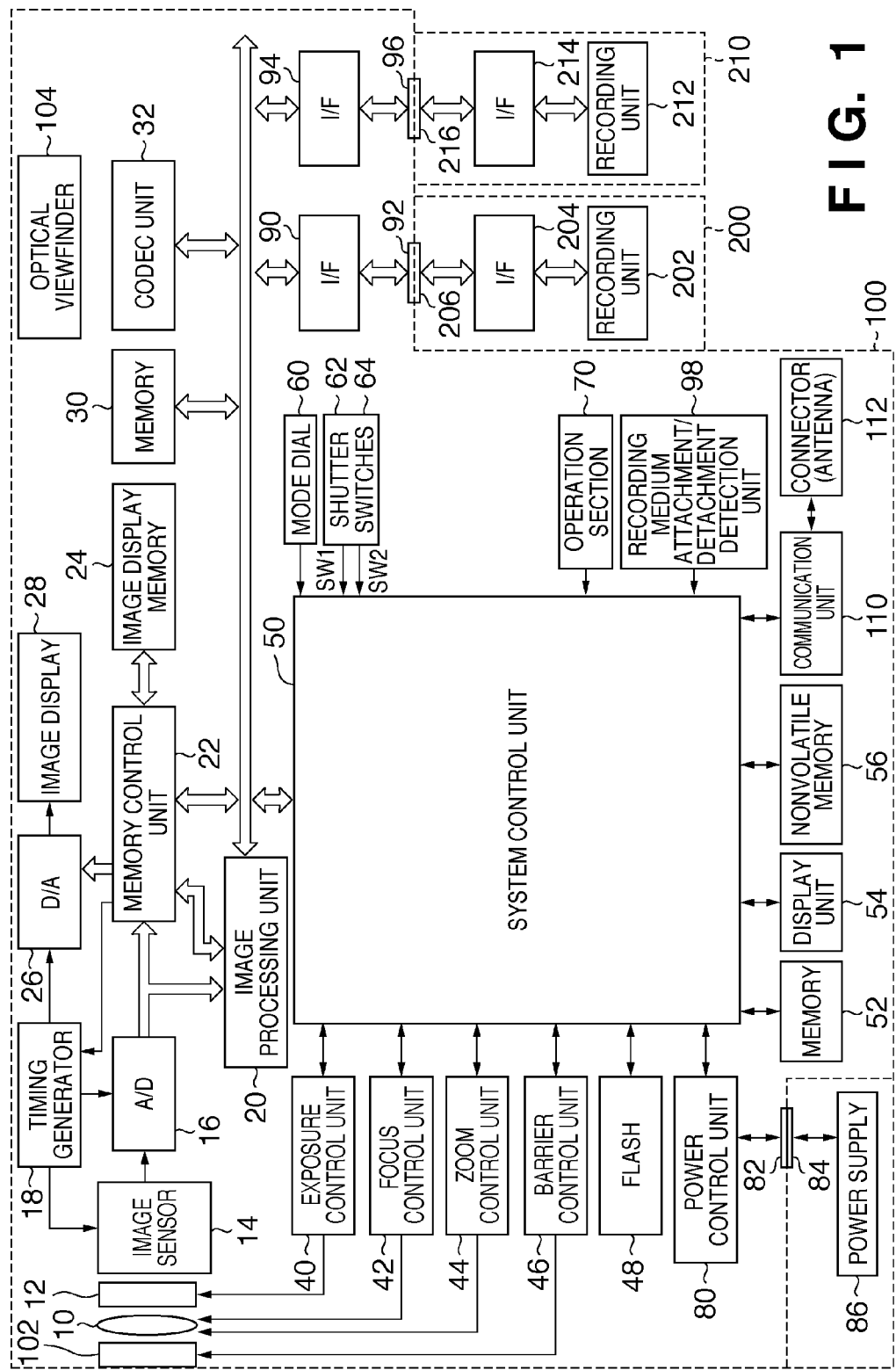
FIG. 1 is a block diagram exemplifying the functional arrangement of an image-capturing apparatus as an example of an image processing apparatus according to an embodiment of the present invention.

FIG. 1 is a block diagram exemplifying the arrangement of an image-capturing apparatus as an example of an image processing apparatus according to an embodiment of the present invention.

The image-capturing apparatus includes an imaging lens 10. A shutter 12 has a stop function. An image sensor 14 such as a CCD sensor or CMOS sensor converts an optical image into an electrical signal. An A/D converter 16 converts an analog image signal output from the image sensor 14 into a digital image signal.

A timing generator 18 supplies clock signals and control signals to the image sensor 14, the A/D converter 16, and a D/A converter 26. A memory control unit 22 and system control unit 50 control the timing generator 18.

An image processing unit 20 performs predetermined pixel interpolation processing and color conversion processing for an image signal from the A/D converter 16 or one from the memory control unit 22.

The image processing unit 20 performs predetermined calculation processing using a captured image signal. Based on the obtained calculation result, the system control unit 50 controls an exposure control unit 40 and focus control unit 42 to implement TTL (Through The Lens) AF (Auto Focus), AE (Auto Exposure), and EF (Electronic Flash pre-emission) functions.

Further, the image processing unit 20 executes predetermined calculation processing using a captured image signal, and performs even TTL AWB (Auto White Balance) processing based on the obtained calculation result. In white balance processing, the image processing unit 20 performs block integration to divide an image formed from captured image signals into a plurality of blocks and obtain the integral value of pixels belonging to each block for each color. The image processing unit 20 also executes white search integration to expand the value of each pixel into chromaticity coordinates, and obtain the integral value of pixel values falling within a white-detection area defined in advance in the chromaticity space. Note that the image processing unit 20 stores the setting of the white-detection area at chromaticity coordinates used in white search integration.

The memory control unit 22 controls the A/D converter 16, the timing generator 18, the image processing unit 20, an image display memory 24, the D/A converter 26, a memory 30, and a codec unit 32.

An image signal output from the A/D converter 16 is written in the image display memory 24 or memory 30 via the image processing unit 20 and memory control unit 22, or directly via the memory control unit 22.

An image display unit 28 such as an LCD or organic EL display displays, via the D/A converter 26, display image data written in the image display memory 24. The image display unit 28 sequentially displays captured image signals, implementing an electronic viewfinder (EVF) function.

The image display unit 28 can also arbitrarily turn on/off the display in accordance with an instruction from the system control unit 50. Turning off the display can greatly reduce the power consumption of an image-capturing apparatus 100.

The memory 30 is a storage device which stores captured still images and moving images, and has a storage capacity enough to store a predetermined number of still images or a moving image of a predetermined time. Even in continuous-image shooting or panoramic-image shooting for successively shooting a plurality of still images, many images can be quickly written in the memory 30.

The memory 30 is also available as a work area for the system control unit 50.

The codec unit 32 reads out an image stored in the memory 30, and performs well-known data compression or decompression processing using adaptive discrete cosine transform (ADCT), wavelet transform, or the like. The codec unit 32 writes the processed data in the memory 30.

The exposure control unit 40 controls the shutter 12 having the stop function. In addition, the exposure control unit 40 provides even a flash light control function in cooperation with a flash 48.

The focus control unit 42 controls focusing of the imaging lens 10. A zoom control unit 44 controls zooming of the imaging lens 10. A barrier control unit 46 controls the operation of a protector 102 serving as a lens barrier to protect the imaging lens 10.

The flash 48 functions as an auxiliary light source in image capturing. The flash 48 has even a light control function and AF auxiliary light projection function.

The exposure control unit 40 and focus control unit 42 are controlled using the TTL method. Based on the calculation result of a captured image signal by the image processing unit 20, the system control unit 50 controls the exposure control unit 40 and focus control unit 42.

The system control unit 50 is, for example, a CPU, and controls the overall image-capturing apparatus 100 by executing a program stored in a memory 52. The memory 52 stores constants, variables, programs, and the like for the operation of the system control unit 50. The memory 52 also stores program charts used in AE control. The program chart is a table which defines the relationship between the control values of the stop aperture diameter (or aperture value) and shutter speed with respect to the exposure value.

A display unit 54 is formed from a combination of output devices such as an LCD, LED, and loudspeaker. The display unit 54 outputs an operating state, message, or the like using a text, image, sound, or the like in accordance with execution of a program by the system control unit 50. One or a plurality of display units 54 are arranged at easily recognizable positions near an operation unit 70 of the image-capturing apparatus 100. Part of the display unit 54 is set in an optical viewfinder 104.

A nonvolatile memory 56 is an electrically erasable/programmable memory and is, for example, an EEPROM.

A mode dial 60, shutter switches 62 and 64, and the operation unit 70 configure operation unit for inputting various operation instructions to the system control unit 50. These operation means are formed from one or a combination of a button, switch, dial, touch panel, pointing based on line-of-sight detection, speech recognition device, and the like.

These operation means will be explained in detail.

The mode dial 60 is a switch for switching and setting respective function modes such as power-off, automatic image shooting mode, programmed image shooting mode, panoramic-image shooting mode, playback mode, multi-window playback/erase mode, and PC connection mode.

The first shutter switch SW1 62 is turned on by pressing a shutter button (not shown) attached to the image-capturing apparatus 100 halfway (half stroke). Then, the system control unit 50 instructs associated blocks to start an operation such as AF (Auto Focus) processing, AE (Auto Exposure) processing, AWB (Auto White Balance) processing, or EF (Electronic Flash pre-emission) processing.

The second shutter switch SW2 64 is turned on by completing the operation of the shutter button (not shown) (full stroke), and designates the start of a series of processes including exposure processing, development processing, and recording processing. In exposure processing, an image signal read out from the image sensor 14 is written in the memory 30 via the A/D converter 16 and memory control unit 22. Further, development processing is done using calculation by the image processing unit 20 or memory control unit 22 under the control of the system control unit 50. In recording processing, an image signal having undergone development processing is read out from the memory 30, compressed by the codec unit 32, and written as an image file on a memory card 200 or 210.

The operation unit 70 is a user interface having operation members such as a switch, button, rotary dial switch, and touch panel. The operation unit 70 allows selecting an image recording mode, compression ratio, image quality, and the like for a captured image.

A power control unit 80 includes a battery detection circuit, a DC-DC converter, and a switching circuit for switching a block to be energized. The power control unit 80 detects loading/unloading of a battery, the type of battery, and the remaining battery level. The power control unit 80 controls the DC-DC converter based on the detection results and an instruction from the system control unit 50. The power control unit 80 applies a necessary voltage to respective units including the recording media 200 and 210 for a necessary period.

A power supply 86 is a primary battery (for example, an alkaline battery or lithium battery), a secondary battery (for example, an NiCd battery, NiMH battery, or Li battery), an AC adapter, or the like. The power supply 86 is attached to the image-capturing apparatus 100 via connectors 82 and 84.

The recording media 200 and 210 such as a memory card or hard disk include recording units 202 and 212 each formed from a semiconductor memory, magnetic disk, or the like, and interfaces 204 and 214 and connectors 206 and 216 with the image-capturing apparatus 100. The recording media 200 and 210 are mounted in the image-capturing apparatus 100 via the medium-side connectors 206 and 216 and the connectors 92 and 96 on the side of the image-capturing apparatus 100. The connectors 92 and 96 are connected to interfaces 90 and 94. A recording medium attachment/detachment detection unit 98 detects whether the recording media 200 and 210 are mounted.

In the embodiment, the image-capturing apparatus 100 includes two systems of interfaces and connectors for attaching a recording medium. However, single or arbitrary numbers of interfaces and connectors for attaching a recording medium can be arranged. Also, interfaces and connectors of different standards may be used for respective systems.

The barrier 102 covers an imaging unit including the lens 10 in the image-capturing apparatus 100 to protect the imaging unit from dirt and damage.

The optical viewfinder 104 is, for example, a TTL viewfinder, and forms a beam having passed through the lens 10 into an image using a prism or mirror. The use of the optical viewfinder 104 allows capturing an image without using an electronic viewfinder function on the image display unit 28. As described above, the optical viewfinder 104 displays information about some functions of the display unit 54, for example, focusing display, camera shake warning display, flash charge display, shutter speed display, aperture value display, and exposure correction display.

A communication unit 110 performs various communication processes including RS232C, USB, IEEE1394, P1284, SCSI, modem, LAN, and wireless communication processes.

A connector (antenna for wireless communication) 112 connects the image-capturing apparatus 100 to another device via the communication unit 110.

Figure 2:
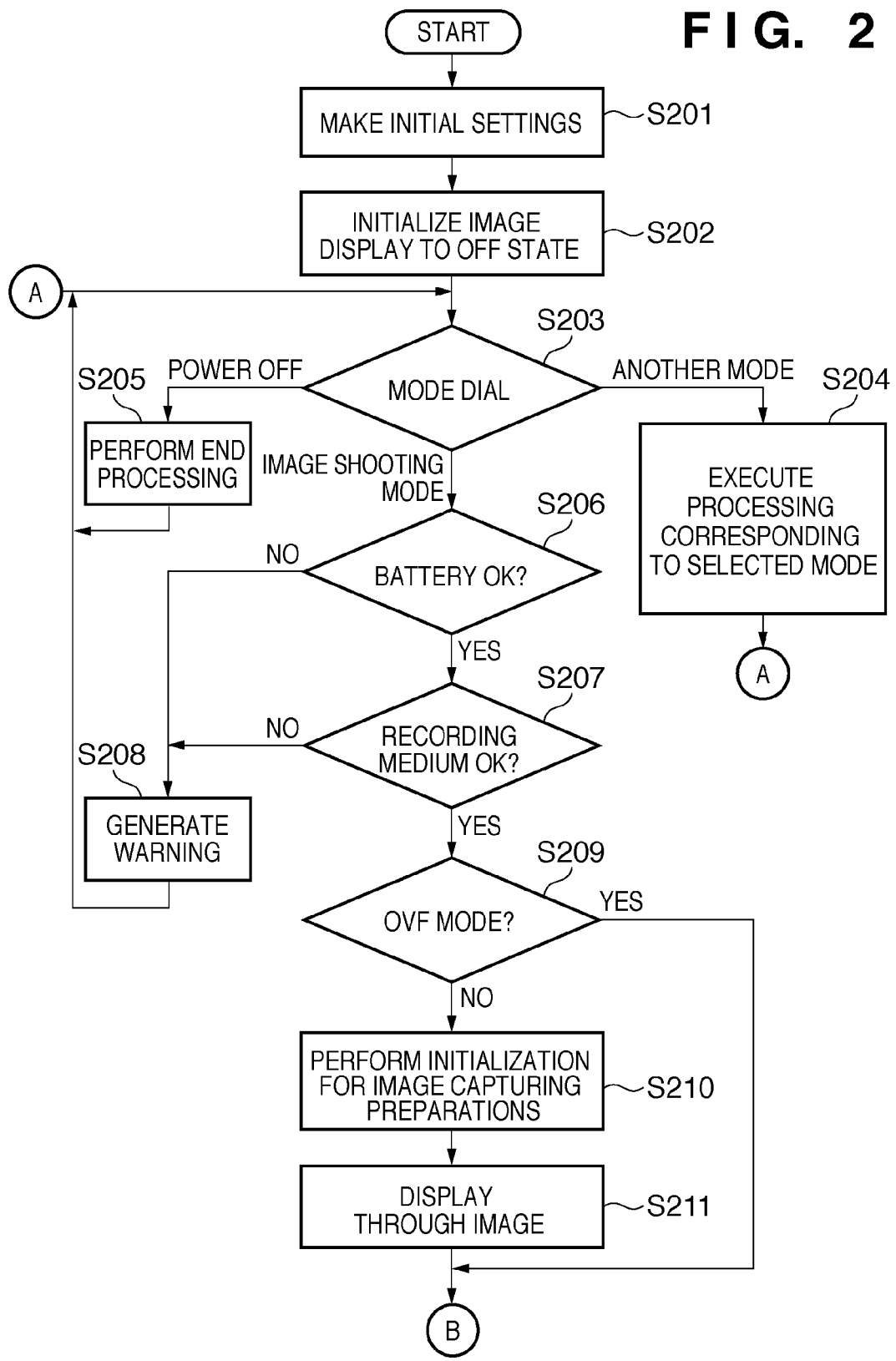
FIG. 2 is a flowchart for explaining the overall operation of the image-capturing apparatus according to the embodiment of the present invention.
Figure 3:
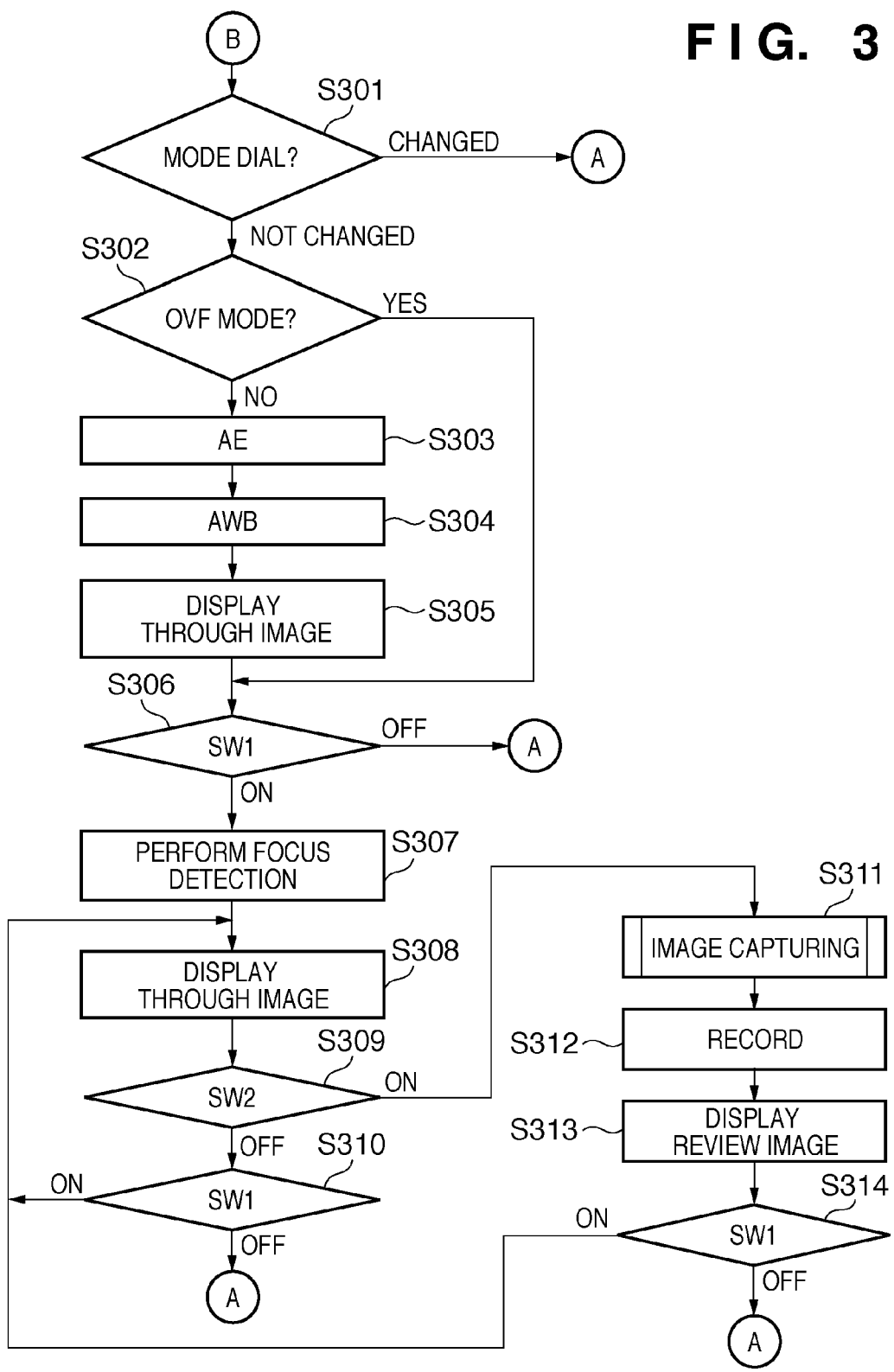
FIG. 3 is a flowchart for explaining the overall operation of the image-capturing apparatus according to the embodiment of the present invention.

The main operation of the image-capturing apparatus 100 will be explained with reference to FIGS. 2 to 4. FIGS. 2 and 3 are flowcharts for explaining the overall operation of the image-capturing apparatus 100.

When the image-capturing apparatus 100 is turned on by, for example, exchanging the battery, the system control unit 50 initializes flags, control variables, and the like (step S201), and initializes the image display of the image display unit 28 to an OFF state (step S202).

The system control unit 50 determines the set position of the mode dial 60. If the mode dial 60 is set to power-off (step S203), the system control unit 50 executes predetermined end processing (step S205), and then returns the process to step S203. For example, this end processing includes the following processes: processing of ending the display on each display unit, processing of closing the lens barrier 102, processing of recording parameters, set values, and a set mode including flags and control variables in the nonvolatile memory 56, and processing of stopping unnecessary power supply to the respective units of the image-capturing apparatus 100 including the image display unit 28 under the control of the power control unit 80.

If the mode dial 60 is set to another mode in step S203, the system control unit 50 executes processing corresponding to the selected mode (step S204), and returns the process to step S203.

If the mode dial 60 is set to the image shooting mode in step S203, the system control unit 50 controls the power control unit 80 to check the remaining capacity and operating state of the power supply 86 formed from a battery or the like (step S206). The system control unit 50 then determines whether the power supply 86 has a problem in the operation of the image-capturing apparatus 100. If the power supply 86 has a problem, the system control unit 50 displays a predetermined warning by an image or sound using the display unit 54 (step S208), and returns the process to step S203.

If the power supply 86 is proper (YES in step S206), the system control unit 50 determines whether the recording medium 200 or 210 has a problem in the operation of the image-capturing apparatus 100, especially in the recording/playback operation (step S207). If the recording medium 200 or 210 has a problem, the system control unit 50 displays a predetermined warning by an image or sound using the display unit 54 (step S208), and returns the process to step S203.

If the recording medium 200 or 210 is proper, the system control unit 50 determines in step S209 which of the OVF (Optical ViewFinder) mode and EVF (Electronic ViewFinder) mode is set. If the OVF mode is set, the system control unit 50 shifts the process to step S301 of FIG. 3 because no through image is displayed.

If the EVF mode is set, the system control unit 50 executes initialization processing in step S210 to cause the image display unit 28 to function as a viewfinder. More specifically, the system control unit 50 sets building components such as the image sensor 14, image processing unit 20, and memory control unit 22 necessary to generate a captured image for through display (through image), in a through image display state in which captured image signals are sequentially displayed.

Upon completion of image capturing preparations, the system control unit 50 starts capturing a moving image, and starts displaying a through image on the image display unit 28 (step S211).

In the through display state, the system control unit 50 sequentially displays, on the image display unit 28 via the memory control unit 22 and D/A converter 26, image signals which have been sequentially written in the image display memory 24 via the image sensor 14, A/D converter 16, image processing unit 20, and memory control unit 22. As a result, the image display unit 28 can function as an electronic viewfinder (EVF).

An operation of capturing a still image in the through image display state by the image-capturing apparatus 100 will be explained with reference to FIGS. 3 and 4.

In step S301, the system control unit 50 determines whether the setting of the mode dial 60 has been changed. If the system control unit 50 detects a change of the setting, it returns the process to step S203, and performs processing corresponding to the state of the mode dial 60. If the setting of the mode dial 60 has not been changed, the system control unit 50 determines the viewfinder mode in step S302 similar to step S209. If the viewfinder mode is the EVF mode, the system control unit 50 advances the process to step S303; if it is the OVF mode, to step S306.

In step S303, the system control unit 50 performs AE processing to automatically set exposure conditions used to capture a through image. More specifically, the image processing unit 20 performs a predetermined photometry calculation for a signal obtained from the image sensor 14, and stores the calculation result in the memory 30. Based on the calculation result stored in the memory 30, the system control unit 50 performs automatic exposure control processing in through image capturing using the exposure control unit 40.

In step S304, the system control unit 50 executes WB processing for the through image. More specifically, the image processing unit 20 executes a predetermined WB calculation for a signal obtained from the image sensor 14, and stores the calculation result in the memory 30. Based on the calculation result stored in the memory 30, the system control unit 50 sets a WB control value in the image processing unit 20. The image processing unit 20 performs WB processing for the through image in accordance with the set WB control value set in the image processing unit 20. The system control unit 50 controls the image display unit 28 to display the through image having undergone WB processing (step S305), and advances the process to step S306.

In step S306, the system control unit 50 checks the state of the shutter switch SW1 62. If the shutter switch SW1 62 is OFF, the system control unit 50 returns the process to step S203; if it is ON, advances the process to step S307.

In step S307, the image processing unit 20 executes a predetermined focus detection for a signal obtained from the image sensor 14, and stores the result in the memory 30. Based on the focus detection result, the system control unit 50 performs AF processing using the focus control unit 42, and adjusts the focus of the imaging lens 10 to an object. After that, the system control unit 50 controls the image display unit 28 to display the through image (step S308), and advances the process to step S309.

In steps S309 and S310, the system control unit 50 checks the states of the shutter switch SW2 64 and shutter switch SW1 62. If the shutter switch SW2 64 is OFF and the shutter switch SW1 62 is also OFF, the system control unit 50 returns the process to step S203. If the shutter switch SW2 64 is OFF and the shutter switch SW1 62 remains ON, the system control unit 50 keeps executing the processing of step S308. If the shutter switch SW2 64 becomes ON, the system control unit 50 advances the process to step S311.

In steps S311 to S313, still image capturing processing is executed.

In step S311, the system control unit 50 executes still image capturing processing according to a method to be described later with reference to FIG. 4. In step S311, the system control unit 50 writes, as a still image file in the recording medium 200, a compressed image signal saved in the memory 30 (step S312). In step S313, the system control unit 50 displays the image captured in step S311 as a review image on the image display unit 28, completing still image capturing processing.

In step S314, the system control unit 50 checks the state of the shutter switch SW1 62. If the shutter switch SW1 62 is OFF, the system control unit 50 returns the process to step S203; if it is ON, returns the process to step S308 to display the through image, and then returns to the image capturing standby state.

Figure 4:
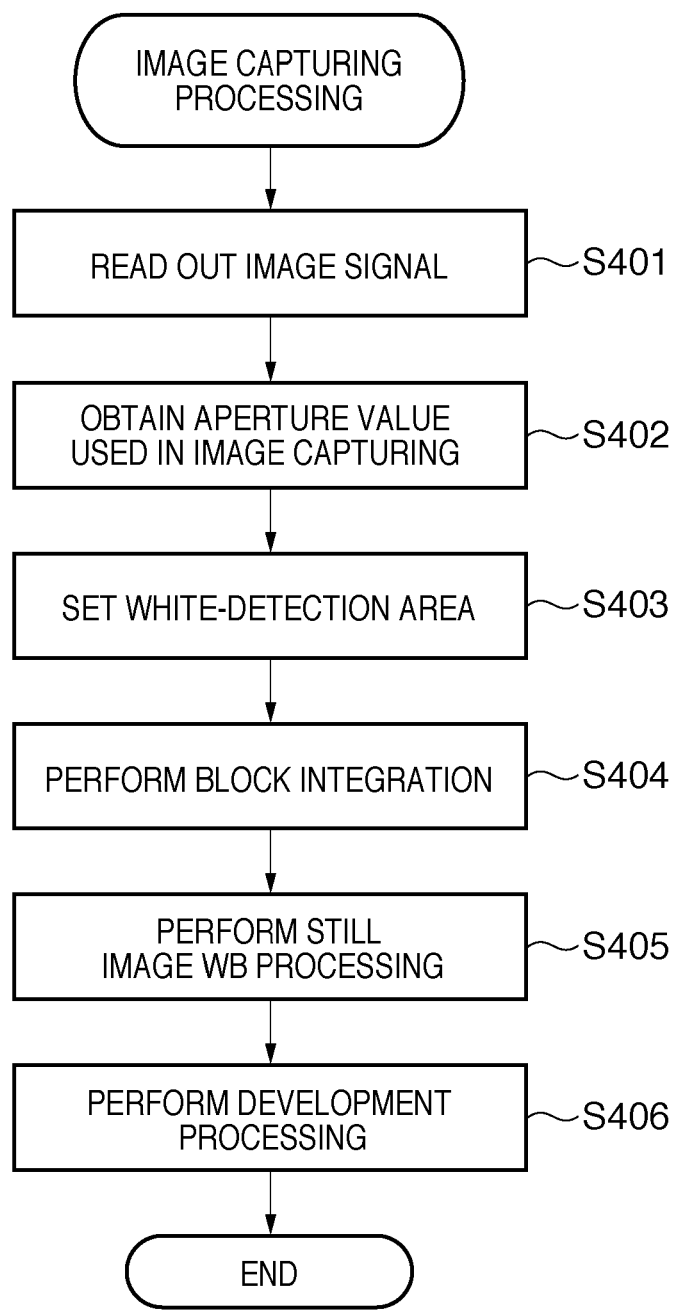
FIG. 4 is a flowchart for explaining an operation of capturing a still image in a through image display state by the image-capturing apparatus according to the embodiment of the present invention.

FIG. 4 is a flowchart for explaining an operation of capturing a still image by the image-capturing apparatus 100.

In step S401, readout of an image signal from the image sensor 14 starts in synchronization with the timing generator 18. At this time, if it has been determined as a result of AE processing in step S303 to turn on the flash 48, the system control unit 50 controls the flash 48 to emit light in synchronization with the front or rear curtain of the shutter 12. The A/D converter 16 converts analog image signals sequentially read out from the image sensor 14 into digital image signals, and sequentially stores them in the memory 30.

In step S402, the system control unit 50 obtains an aperture value determined in AE processing of step S303.

In step S403, the system control unit 50 sets a white-detection area for white balance processing in the image processing unit 20. In white balance processing, the white-detection area is set using the blackbody radiation axis as a reference in a predetermined chromaticity coordinate space. The white-detection area is obtained by capturing the image of a white object under environment light sources having different characteristics (for example, color temperature), and plotting calculated color evaluation values. In the white-detection area, a white evaluation value range corresponding to the environment light source is set in advance. Thus, an environment light source can be estimated from an integral value for each color component of pixels whose color evaluation values fall within the white-detection area. In the embodiment, the white-detection area is switched in accordance with the aperture value (F-number) because the color crosstalk component amount depends on the aperture size. Switching of the white-detection area will be described with reference to FIG. 5.

In step S403, the system control unit 50 selects, based on the aperture value obtained in step S402, one of pieces of information which are stored in advance in the nonvolatile memory 56 and specify a white-detection area. Then, the system control unit 50 sets a white-detection area in the image processing unit 20.

In step S404, the image processing unit 20 performs block integration processing for the image signal read out in step S401 for white balance processing. More specifically, pixel values contained in a block are averaged for the respective colors to calculate color average values R[i], G[i], and B[i]. Further, color evaluation values Cx[i] and Cy[i] are calculated for each block using the following equations:

$$Cx[i]=(R[i]-B[i])/Y[i]\times 1024$$

$$Cy[i]=(R[i]+B[i]-2G[i])/Y[i]\times 1024$$

where Y[i]=R[i]+2G[i]+B[i], i=1 ... m (m is a block count)

The image processing unit 20 determines that a block having color evaluation values Cx[i] and Cy[i] falling within the white-detection area is a white block. The image processing unit 20 calculates integral values SumR, SumG, and SumB of red, green, and blue pixels contained in the white block (white search integration), and stores the result in the memory 30.

In step S405, the image processing unit 20 reads out the result of integration executed in step S404 from the memory 30, and calculates white balance coefficients WBCo_R, WBCo_G, and WBCo_B based on, for example, the following equations:

WBCo_R=SumY×1024/SumR

WBCo_G=SumY×1024/SumG

WBCo₁₃B=SumY×1024/SumB where SumY=(SumR+2×SumG+SumB)/4

The image processing unit 20 stores the calculated still image white balance control values (white balance coefficients) in the memory 30.

In step S406, the image processing unit 20 executes development processing. The development processing includes color interpolation processing and white balance processing. Depending on the recording format, encoding processing by the codec unit 32, generation of a recording file, and the like are also performed. The image signal having undergone development processing is saved as image data in the memory 30.

Figure 5:
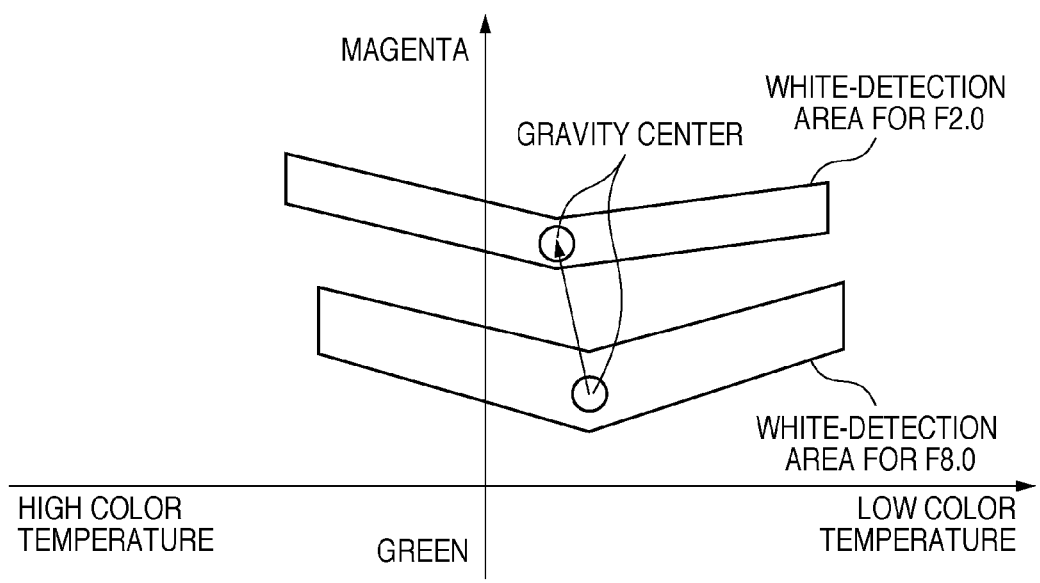
FIG. 5 is a graph exemplifying the relationship between the white-detection area and the aperture value that is set in the embodiment of the present invention.

FIG. 5 is a graph exemplifying the relationship between the white-detection area and the aperture value that is set in the embodiment.

In FIG. 5, the white-detection area is represented as an area in a chromaticity space where the color temperature axis and the magenta-green axis are perpendicular to each other. In the chromaticity space, the X-axis indicates the color temperature (color evaluation value Cx[i]), the positive direction is a low-color temperature side, that is, red direction, and the negative direction is a high-color temperature side, that is, blue direction. The Y-axis is the magenta-green axis (color evaluation value Cy[i]), the positive direction is the magenta direction, and the negative direction is the green direction.

As described above, the white-detection area defines an area where the color evaluation values of a white object exist under various light sources based on the blackbody radiation axis. The sensitivity of the color filter for each color changes depending on composite elements including the internal arrangement of the image sensor, the image capturing system such as the color filter, the lens structure, and the optical system such as the coating and filter. For this reason, the position and size of the white-detection area in the chromaticity space change. When light which obliquely enters the image sensor enters not only a predetermined pixel but also an adjacent pixel to generate color crosstalk, the color crosstalk state also changes depending on the incident angle of the beam. The angle of light incident on the image sensor, especially the maximum incident angle with respect to the optical axis depends on the aperture size. As the aperture is larger (aperture value or F-number is smaller), a larger quantity of beam obliquely enters the image sensor. Hence, the relative sensitivity of each color pixel depends on the aperture value. As a result, even the position and size of the white-detection area in the chromaticity space depend on the aperture value.

As described above, the sensitivity to the wavelength of a color having high transmittance for a beam increases in a pixel of another color adjacent to a pixel of the color having high transmittance for a beam. Accordingly, the sensitivity of the pixel of the color having high transmittance for a beam relatively decreases. The spectral sensitivity characteristic of the image sensor changes between a case in which color crosstalk occurs and a case in which no color crosstalk occurs, and the color balance of an image also changes between these two cases. As the degree of color crosstalk becomes higher, the color balance changes more greatly. The embodiment executes white balance processing by setting a white-detection area to correct a change of the color balance caused by color crosstalk, thereby simply, effectively correcting color crosstalk in a captured image. More specifically, the white-detection area used in white balance processing for a captured image is dynamically set in accordance with an aperture value used in image capturing.

FIG. 5 exemplifies a white-detection area for F2.0 and that for F8.0. The transmittances and transmission wavelengths of red, blue, and green filters which form a color filter differ between F2.0 and F8.0. At F2.0, color crosstalk is large, the sensitivity in the blue direction increases, and that in the green direction decreases. To cancel this, the white-detection area extends in a high-color temperature direction and is positioned in the magenta direction (near magenta). In contrast, at F8.0, entrance of an oblique beam decreases compared to that at F2.0, and generation of color crosstalk is suppressed. Thus, the sensitivity in the magenta-green direction greatly changes, and at the same time, the sensitivity in the blue direction slightly changes.

More specifically, the spectral sensitivity characteristic changes due to color crosstalk, so the position of the blackbody radiation axis serving as the base of the white-detection area changes depending on the aperture value. The position of the white-detection area is therefore set in accordance with that of the blackbody radiation axis corresponding to the aperture value. When color crosstalk is large, color crosstalk caused by light which passes through a green color filter and then enters an adjacent blue or red pixel becomes relatively large. The color evaluation value near the green wavelength is highly likely to be incorrect. Thus, when the aperture value is small and color crosstalk is large, a white-detection area with a lower ratio of the green component contained in the white-detection area is set than is set when color crosstalk is small. That is, the smaller the aperture value, the smaller the expansion of the white-detection area in the magenta direction in the chromaticity space to be set.

The white balance change amount corresponding to the aperture value can be simply obtained from the motion vector of the gravity center of the white-detection area. The change amount can be used to correct the white balance change amount corresponding to the aperture value for a light source having a fixed-value white balance called a preset white balance, such as sunlight or a bulb. A preset white balance correction method will be described later with reference to FIG. 6.

In the embodiment, to simplify processing, a white-detection area for F2.0 is used in a full-aperture state, and a white-detection area for F8.0 is used at small apertures of F8.0 or more. White-detection areas corresponding to aperture values (for example, F4.0 and F5.6) between the full and small apertures may be prepared in advance, or obtained from the detection areas for F2.0 and F8.0 according to a method such as linear interpolation or linear transformation. When the image-capturing apparatus 100 is of a lens interchangeable type, the color crosstalk characteristic changes depending on even the lens diameter. In this case, pieces of white-detection area information corresponding to a lens can also be stored for a plurality of aperture values.

Figure 6:
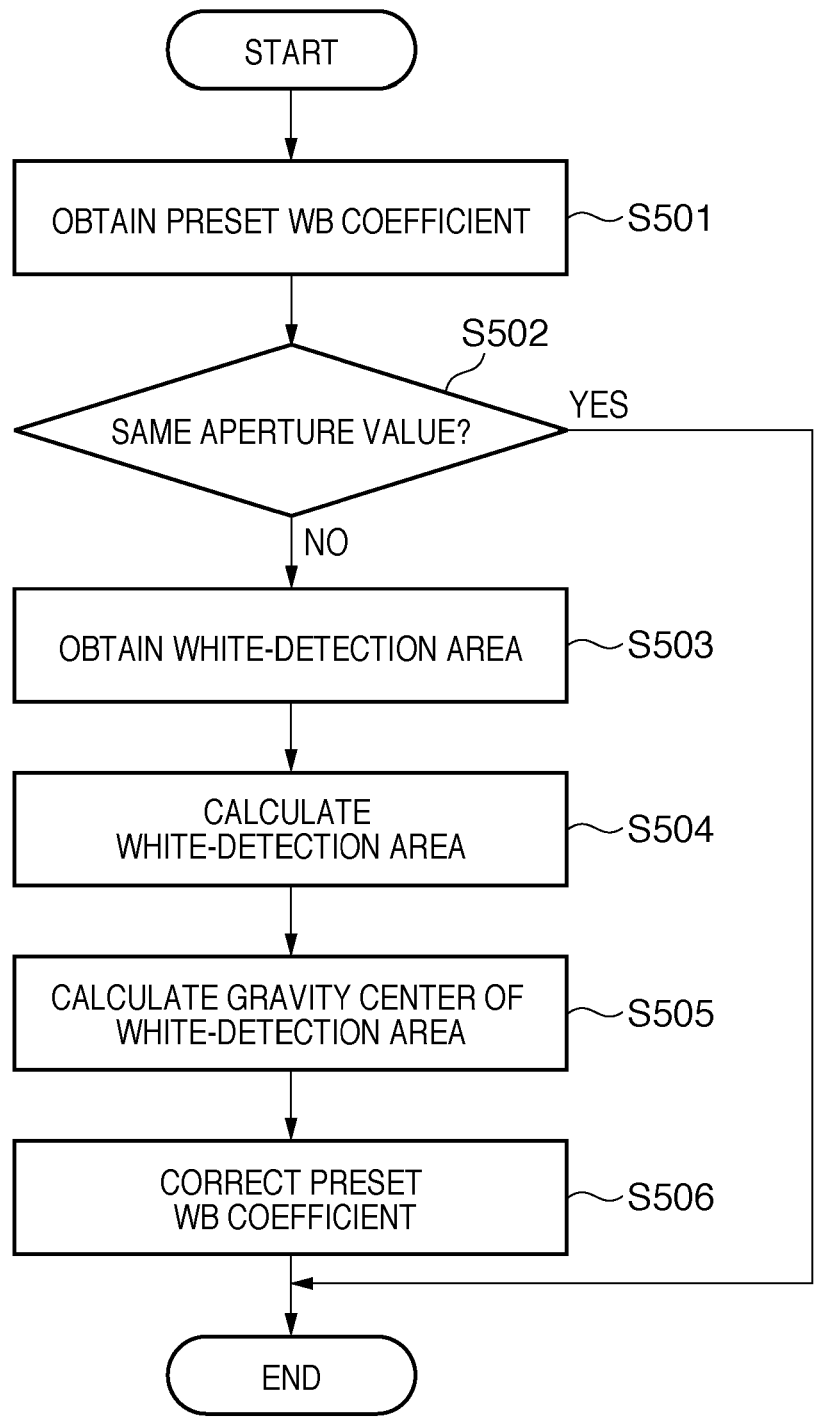
FIG. 6 is a flowchart for explaining an operation of correcting a preset white balance coefficient by the image-capturing apparatus according to the embodiment of the present invention.

FIG. 6 is a flowchart for explaining an operation of correcting a preset white balance coefficient set in advance for a light source such as sunlight or a bulb.

In step S501, the system control unit 50 reads out, from the nonvolatile memory 56, a predetermined white balance coefficient which is set in advance in accordance with the light source such as sunlight or a bulb, and an aperture value used when the white balance coefficient was obtained. Note that the predetermined white balance coefficient and aperture value may be stored in a storage device (not shown) other than the nonvolatile memory 56.

In step S502, the system control unit 50 compares the aperture value corresponding to the predetermined white balance coefficient obtained in step S501 with the current aperture value. If the aperture value used when the predetermined white balance coefficient was calculated is equal to the current aperture value, the white balance coefficient need not be corrected, so the system control unit 50 ends the processing. If these aperture values are different, the system control unit 50 obtains information which is stored in the nonvolatile memory 56 and defines the white-detection area (step S503).

In the embodiment, the nonvolatile memory 56 stores only pieces of information (and corresponding gravity center positions) which define white-detection areas corresponding to F2.0 and F8.0 out of aperture values settable for the shutter 12. In step S503, the system control unit 50 reads out, from the nonvolatile memory 56, pieces of information which define white-detection areas corresponding to F2.0 and F8.0, and stores them in the memory 30.

In step S504, the system control unit 50 obtains a white-detection area corresponding to the aperture value used when the predetermined white balance coefficient was calculated, and a white-detection area corresponding to the current aperture value. If the aperture value used when the predetermined white balance coefficient was calculated is a value falling within the range of F2.0 to F8.0, the system control unit 50 obtains a corresponding white-detection area by interpolation calculation using the pieces of information which define white-detection areas for F2.0 and F8.0. Even if the current aperture value is a value falling within the range of F2.0 to F8.0, the system control unit 50 obtains a corresponding white-detection area in the same way. The system control unit 50 stores, in the memory 30, pieces of white-detection area information obtained by interpolation calculation. Needless to say, no interpolation calculation is necessary if the current aperture value and the aperture value used when the predetermined white balance coefficient was calculated are F2.0 or F8.0.

In step S505, the system control unit 50 calculates the gravity centers (coordinates in the chromaticity space) of the white-detection areas corresponding to the current aperture value and the aperture value used when the predetermined white balance coefficient was calculated. When the gravity center of the detection area has already been obtained as a design value, even the gravity center position has been stored in the nonvolatile memory 56 at that time, and no recalculation is necessary.

In step S506, the system control unit 50 obtains the motion vectors of the gravity centers of the white-detection areas corresponding to the current aperture value and the aperture value used when the predetermined white balance coefficient was calculated. Based on the moving amounts of the gravity center in the color temperature direction and magenta-green direction, the system control unit 50 corrects the predetermined white balance coefficient. More specifically, the system control unit 50 corrects the white balance coefficient such that a white pixel detected in the white-detection area corresponding to the current aperture value is corrected to be white. The system control unit 50 stores the corrected white balance coefficient in the memory 30 as a predetermined white balance coefficient at the preset white balance.

Figure 7:
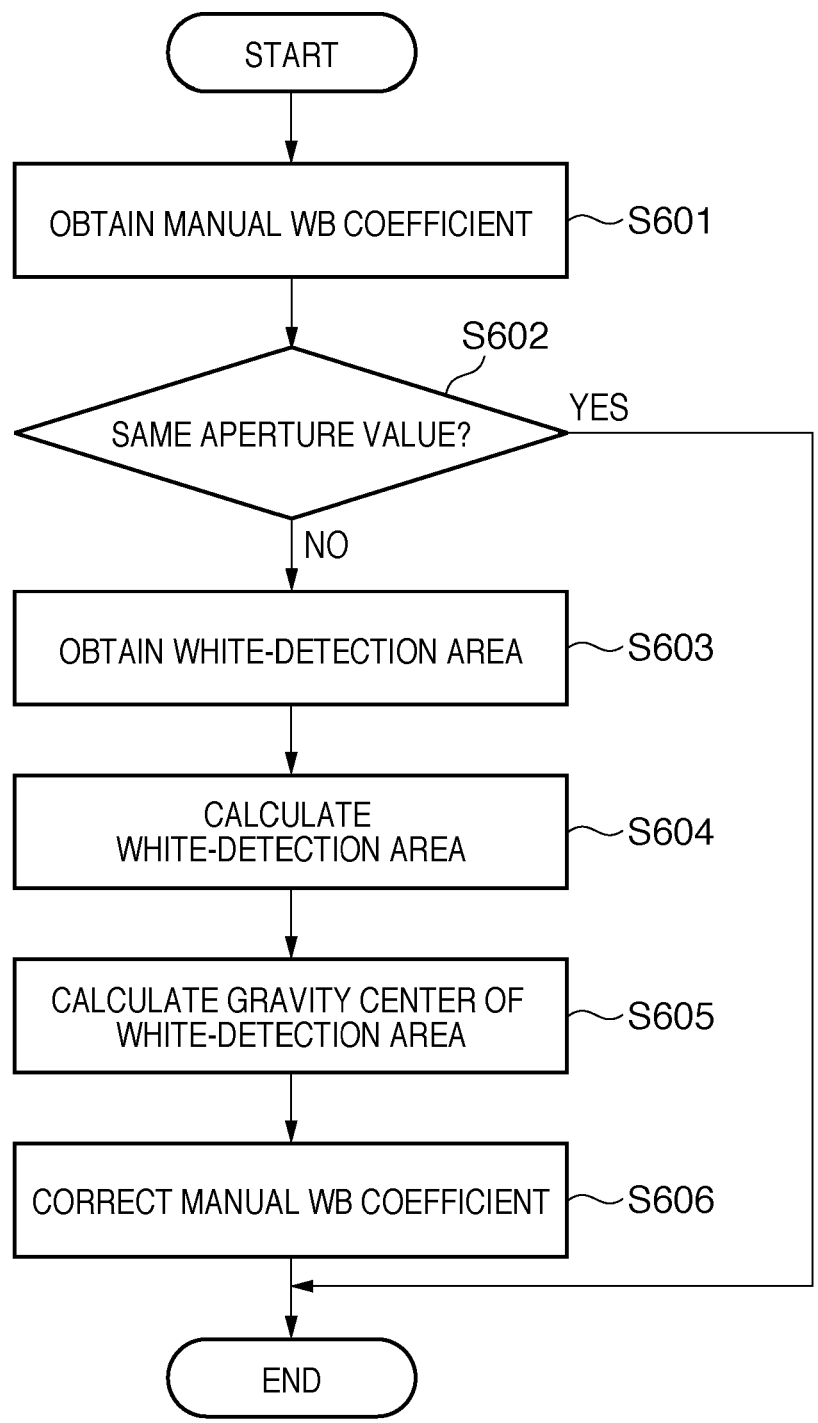
FIG. 7 is a flowchart for explaining an operation of correcting a manual white balance coefficient by the image-capturing apparatus according to the embodiment of the present invention.

FIG. 7 is a flowchart for explaining an operation of correcting a white balance coefficient set in manual white balance processing.

The manual white balance is a function of capturing, by an image-capturing apparatus, an object the user wants to capture its image whitely (white capturing), and generating a white balance coefficient from the captured image by the image-capturing apparatus. In the embodiment, the system control unit 50 saves, in the nonvolatile memory 56, a white balance coefficient generated by the manual white balance function, and an aperture value used in white capturing.

In step S601, the system control unit 50 reads out, from the nonvolatile memory 56, a white balance coefficient generated by the manual white balance setting function, and an aperture value used in white capturing.

In step S602, the system control unit 50 compares the aperture value obtained in step S601 with a currently set aperture value. If the aperture value used in white capturing is equal to the current aperture value, no correction is necessary, and thus the system control unit 50 ends the correction processing. If these aperture values are different, the system control unit 50 corrects the white balance coefficient in the processes of step S603 and subsequent steps.

The processes in steps S603 to S606 are the same as those described in step S503 to S506 of FIG. 6. The system control unit 50 obtains, as the moving amount of the gravity center of the white-detection area, a change of the white-detection area that corresponds to the aperture value, and corrects the white balance coefficient of the manual white balance to adjust a white balance for a white-detection area corresponding to the current aperture value. The system control unit 50 stores the corrected white balance coefficient in the memory 30 and ends the correction processing.

As described above, according to the embodiment, when color crosstalk dependent on the aperture value occurs, color crosstalk can be corrected by a simple method by performing white balance processing using a white-detection area with an optimum white balance that corresponds to the color crosstalk characteristic.

More specifically, a plurality of white-detection areas for white balance processing are stored in advance in accordance with aperture values. A white-detection area corresponding to an aperture value in exposure is set to perform white balance processing. Even if the spectral sensitivity characteristic of the image sensor changes due to color crosstalk dependent on the aperture value, the white balance of an image can be obtained by satisfactorily correcting the color crosstalk. The white-detection area is set to correct a change of the color balance (spectral sensitivity characteristic) caused by color crosstalk, and white balance processing is done. A correct color balance can be expressed without any problem such as a decrease in S/N ratio or variations of the exposure upon applying a correction gain to an image signal. As a result, a higher-quality image can be attained by simpler processing, compared to a conventional technique of applying a gain for color crosstalk correction separately from white balance processing.

Note that the embodiment has described a method using a white-detection area with an optimum white balance that corresponds to an aperture value used in still image capturing. However, this method is not limited to still image capturing and may be executed in the through image display state. Since a white-detection area with an optimum white balance that corresponds to an F-number in exposure is used, the present invention is applicable to a case in which exposure and white balance processing are executed, such as the through image display state or moving image recording state. The embodiment has described only an example in which an aperture value is obtained in AE processing for a through image different from an actually captured image in step S303. However, according to the present invention, an aperture value may be obtained at a different timing. For example, in the OVF mode, AE processing in step S303 for a through image cannot be done, so AE processing may be performed in actual image capturing in step S311 after determination of SW2 and an aperture value may be obtained at this time.

The present invention has been explained regarding a specific embodiment. However, the above-described embodiment is merely an example to aid the understanding of the present invention, and does not limit the invention. It will readily occur to those skilled in the art that various changes and modifications are applicable to the above-described embodiment without departing from the scope of the invention.

For example, the above-described embodiment has explained a case in which the image processing apparatus according to the present invention is applied to an image-capturing apparatus, but the image capturing and recording functions are not indispensable for the present invention. The present invention can be practiced in an arbitrary device having a function of processing an image captured by an image sensor having a color filter. For example, the present invention is applicable to a cell phone, a PDA (Personal Digital Assistant), various information devices having a camera function, and an information processing apparatus capable of loading and processing captured image data.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-104235, filed on Apr. 28, 2010, which is hereby incorporated by reference herein its entirety.

What is claimed is:

1. An image processing apparatus which processes an image signal obtained using an image sensor including a color filter, the apparatus having a hardware processor, comprising:
   an obtaining unit configured to obtain an aperture value used in image capturing;
   a setting unit configured to set a white-detection area used in white balance processing for the image signal;
   and a correction unit configured to apply white balance processing to the image signal using the white-detection area set by said setting unit,
   wherein said setting unit sets a white-detection area based on the aperture value obtained by said obtaining unit to correct a change of a spectral sensitivity characteristic of the image sensor that is caused by color crosstalk of the image signal depending on an aperture value,
   and wherein said setting unit sets the white-detection area in the magenta direction to be narrower as the aperture value becomes smaller.

2. The apparatus according to claim 1, further comprising first storage unit configured to store in advance information which defines a corresponding white-detection area for each of a plurality of aperture values,
   wherein when said first storage unit stores the information for the aperture value obtained by said obtaining unit, said setting unit sets the white-detection area using the information which defines the corresponding white-detection area, and
   when said first storage unit does not store the information for the aperture value obtained by said obtaining unit, said setting unit interpolates, out of pieces of information stored in said first storage unit, information for an aperture value larger than the aperture value obtained by said obtaining unit and information for an aperture value smaller than the aperture value obtained by said obtaining unit, thereby setting the white-detection area corresponding to the aperture value obtained by said obtaining unit.

3. The apparatus according to claim 1, wherein
   the color filter includes a red filter, a green filter, and a blue filter,
   the white-detection area is an area in a chromaticity space, and
   said setting unit sets the white-detection area positioned further in the magenta direction as the aperture value becomes smaller.

4. The apparatus according to claim 3, further comprising second storage unit configured to store a white balance coefficient calculated in advance, and an aperture value used when an image used to calculate the white balance coefficient was captured,
   wherein when the aperture value used when the image used to calculate the white balance coefficient was captured is different from the aperture value obtained by said obtaining unit, said correction unit corrects the white balance coefficient to a coefficient corresponding to the aperture value obtained by said obtaining unit based on a difference in position in the chromaticity space between a white-detection area corresponding to the aperture value used when the image used to calculate the white balance coefficient was captured and the white-detection area corresponding to the aperture value obtained by said obtaining unit, and uses the corrected coefficient for the white balance processing.

5. An image-capturing apparatus comprising:
   an image sensor including a color filter; and
   an image processing apparatus according to claim 1 that processes an image signal obtained using said image sensor.

6. A method of controlling an image processing apparatus having a hardware processor, which processes an image signal obtained using an image sensor including a color filter, the method comprising:
   an obtaining step of controlling the image processing apparatus to obtain an aperture value used in image capturing;

a setting step of controlling the image processing apparatus to set a white-detection area used in white balance processing for the image signal; and a correction step of controlling the image processing apparatus to apply white balance processing to the image signal using the white-detection area set in the setting step, wherein in the setting step, a white-detection area based on the aperture value obtained in the obtaining step is set to correct a change of a spectral sensitivity characteristic of the image sensor that is caused by color crosstalk of the image signal depending on an aperture value, and wherein in the setting step, the white-detection area is set so that the white-detection area in the magenta direction to be narrower as the aperture value becomes smaller.

7. A non-transitory computer-readable recording medium recording a program for causing a computer to function as each unit of an image processing apparatus according to claim 1.

* * * * *